(12) United States Patent
Rahimi et al.

(10) Patent No.: US 10,829,656 B2
(45) Date of Patent: Nov. 10, 2020

(54) INKJET INK

(71) Applicant: HEWLETT-PACKARD DEVELOPMENT COMPANY, L.P., Houston, TX (US)

(72) Inventors: Alireza Rahimi, San Diego, CA (US); George Sarkisian, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 44 days.

(21) Appl. No.: 16/093,101

(22) PCT Filed: Jul. 20, 2016

(86) PCT No.: PCT/US2016/043159
§ 371 (c)(1),
(2) Date: Oct. 11, 2018

(87) PCT Pub. No.: WO2018/017077
PCT Pub. Date: Jan. 25, 2018

(65) Prior Publication Data
US 2019/0177564 A1     Jun. 13, 2019

(51) Int. Cl.
*C09D 11/38* (2014.01)
*B41M 5/00* (2006.01)
(Continued)

(52) U.S. Cl.
CPC ............ *C09D 11/38* (2013.01); *B41J 2/2107* (2013.01); *B41M 5/0017* (2013.01);
(Continued)

(58) Field of Classification Search
CPC . B41J 2/01; B41J 2/1755; B41J 2/2117; B41J 2/21; B41J 2/0057; B41J 3/60;
(Continued)

(56) References Cited

U.S. PATENT DOCUMENTS

| 4,204,051 | A | 5/1980 | Wellner et al. |
| 5,700,851 | A | 12/1997 | Banning |

(Continued)

FOREIGN PATENT DOCUMENTS

| CN | 101590726 | 12/2009 |
| CN | 102884145 | 1/2013 |

(Continued)

OTHER PUBLICATIONS

International Search Report and Written Opinion for International Application No. PCT/US2016/043159 dated Mar. 30, 2017, 8 pages.

(Continued)

*Primary Examiner* — Manish S Shah
(74) *Attorney, Agent, or Firm* — Dierker & Kavanaugh PC

(57) ABSTRACT

An inkjet ink for an offset coated medium includes: water; a colorant; a binder that is a polyurethane-based dispersion; a co-solvent; and two or more surfactants. A first surfactant has a first hydrophilic lipophilic balance (HLB) value either within a water dispersible range or within a hydrophobic range and a second surfactant has a second HLB value within a hydrophobic range. The combination of the first surfactant and the second surfactant is to adjust a surface tension of the inkjet ink to a value lower than a surface tension of the offset coated medium on which the inkjet ink is to be printed.

11 Claims, 3 Drawing Sheets

(51) Int. Cl.
  *C09D 11/102* (2014.01)
  *C09D 11/322* (2014.01)
  *C09D 11/40* (2014.01)
  *B41J 2/21* (2006.01)
  *C09D 11/54* (2014.01)

(52) U.S. Cl.
  CPC .......... *C09D 11/102* (2013.01); *C09D 11/322* (2013.01); *C09D 11/40* (2013.01); *C09D 11/54* (2013.01)

(58) Field of Classification Search
  CPC .............. B41J 2002/012; B41J 2/04598; B41J 2/04588; B41J 2/04595; B41J 2/04586; B41J 2/14274; B41J 2/1433; B41J 2/045; B41J 2/16538; B41J 2002/16502; B41J 25/001; B41J 2/211; B41J 2/17; B41J 2/17593; B41J 2/2107; B41J 2/2114; B41J 2/2056; B41J 2/1623; B41J 2202/00; B41J 2202/03; B41J 11/0015; B41J 11/002; B41J 2/04581; B41J 2/055; B41J 2/14201; B41J 25/34; B41J 25/003; B41J 25/312; B41J 2025/008; B41J 2202/21; B41J 2/17596; B41J 2/16508; B41J 2/1652; B41J 2/175; B41J 2/17563; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41M 5/0011; B41M 7/0072; B41M 5/52; B41M 5/5218; B41M 5/5227; B41M 5/0017; B41M 5/0023; B41M 5/0047; B41M 7/00; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033
  See application file for complete search history.

(56) References Cited

U.S. PATENT DOCUMENTS

| | | | |
|---|---|---|---|
| 5,785,743 A | 7/1998 | Adamic et al. | |
| 5,889,083 A | 3/1999 | Zhu | |
| 6,136,890 A | 10/2000 | Carlson et al. | |
| 7,429,293 B2 | 9/2008 | Cai | |
| 8,008,391 B2 | 8/2011 | Enomoto et al. | |
| 8,025,384 B2 | 9/2011 | Ogasawara et al. | |
| 8,556,402 B2 | 10/2013 | Li | |
| 8,974,049 B2 | 3/2015 | Prasad et al. | |
| 9,090,734 B2 | 7/2015 | Kraiter et al. | |
| 9,296,910 B2 | 3/2016 | Brown | |
| 2005/0039634 A1* | 2/2005 | Hermansky | C09D 11/36 106/31.59 |
| 2007/0212900 A1 | 9/2007 | Sarkisian et al. | |
| 2007/0282037 A1 | 12/2007 | Anderson et al. | |
| 2008/0022887 A1 | 1/2008 | Tanoue | |
| 2008/0138530 A1 | 6/2008 | Lin et al. | |
| 2008/0146691 A1 | 6/2008 | Kruger et al. | |
| 2008/0257203 A1 | 10/2008 | Choy et al. | |
| 2009/0071366 A1 | 3/2009 | Akers, Jr. et al. | |
| 2009/0185019 A1 | 7/2009 | Ogasawara | |
| 2009/0239996 A1 | 9/2009 | Saito | |
| 2010/0047456 A1 | 2/2010 | Kariya | |
| 2010/0201768 A1 | 8/2010 | Udagawa | |
| 2011/0032303 A1 | 2/2011 | Li | |
| 2011/0164086 A1 | 7/2011 | Ggoto | |
| 2011/0281988 A1 | 11/2011 | Tanoue | |
| 2012/0035317 A1 | 2/2012 | Roberts et al. | |
| 2013/0083117 A1 | 4/2013 | Ohmoto | |
| 2013/0108809 A1 | 5/2013 | Noguchi et al. | |
| 2013/0201252 A1 | 8/2013 | Namba | |
| 2013/0209708 A1 | 8/2013 | Gane et al. | |
| 2013/0253130 A1 | 9/2013 | Berge | |
| 2013/0266776 A1 | 10/2013 | Matsuoka et al. | |
| 2013/0267656 A1 | 10/2013 | Berge | |
| 2013/0307914 A1 | 11/2013 | Chen | |
| 2013/0328973 A1* | 12/2013 | Kakikawa | C09D 11/322 347/56 |
| 2014/0037913 A1 | 1/2014 | Barton et al. | |
| 2014/0055520 A1 | 2/2014 | Inumaru et al. | |
| 2014/0192112 A1 | 7/2014 | Nagashima | |
| 2014/0364548 A1 | 12/2014 | Everhardus et al. | |
| 2016/0215157 A1* | 7/2016 | Kakikawa | C09D 11/326 |
| 2017/0037269 A1* | 2/2017 | Isobe | B41J 2/01 |
| 2017/0183522 A1* | 6/2017 | Chaffins, Jr. | B41J 2/01 |

FOREIGN PATENT DOCUMENTS

| | | |
|---|---|---|
| CN | 104662108 | 5/2015 |
| JP | H0625377 | 2/1994 |
| JP | 2009233486 | 10/2009 |
| JP | 2012201730 | 10/2012 |
| RU | 2264493 | 11/2005 |
| SU | 482433 | 5/1976 |
| WO | WO 0194480 | 12/2001 |
| WO | WO 2007112244 | 10/2007 |
| WO | WO 2012105949 | 8/2012 |
| WO | WO 2015023274 | 2/2015 |
| WO | WO 2015041702 | 3/2015 |
| WO | WO 2015112115 | 7/2015 |
| WO | WO 2015116028 | 8/2015 |
| WO | WO 2015116029 | 8/2015 |
| WO | WO 2015116030 | 8/2015 |
| WO | WO 2015130498 | 9/2015 |
| WO | WO-2015187143 | 12/2015 |
| WO | WO 2016018 06 | 2/2016 |
| WO | WO 2016030452 | 3/2016 |
| WO | WO 2016030454 | 3/2016 |
| WO | WO-2016068985 | 5/2016 |
| WO | WO-2016122563 | 8/2016 |
| WO | WO-2016122566 | 8/2016 |
| WO | WO 2016122569 | 8/2016 |
| WO | WO-2017074349 | 5/2017 |
| WO | WO 2018156156 | 8/2018 |
| WO | WO 2018182568 | 10/2018 |
| WO | WO 2018190806 | 10/2018 |

OTHER PUBLICATIONS

"Definition of compound"—Chemistry Dictionary, 2017, 4 pages.
Nelson, Daniel, "Amino Group. Definition and Examples Scien Trend ", May 16, 2019, 3 pages.
"alkyl group ", IUPAC Gold Book, 2008, 1 page.

* cited by examiner

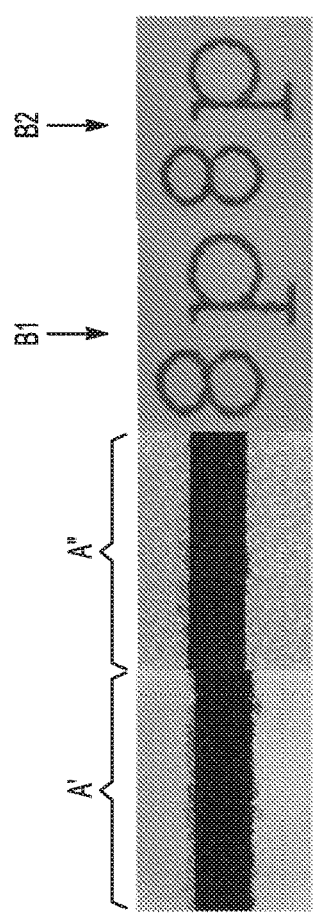
*Fig-3A*
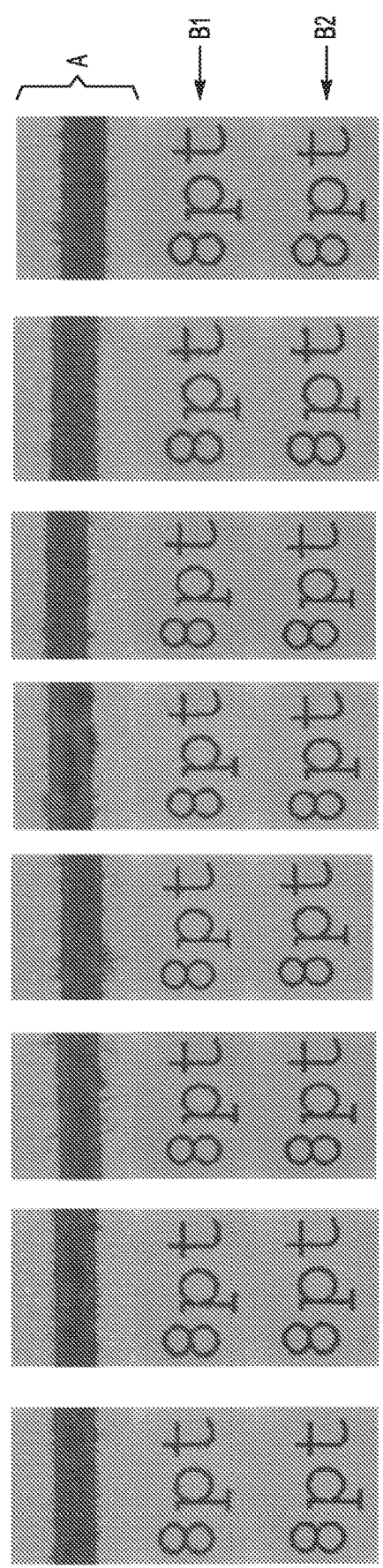

INKJET INK

BACKGROUND

In addition to home and office usage, inkjet technology has been expanded to high-speed, commercial and industrial printing. Inkjet printing is a non-impact printing method that utilizes electronic signals to control and direct droplets or a stream of ink to be deposited on media. Some commercial and industrial inkjet printers utilize fixed printheads and a moving substrate web in order to achieve high speed printing. Current inkjet printing technology involves forcing the ink drops through small nozzles by thermal ejection, piezoelectric pressure or oscillation onto the surface of the media. This technology has become a popular way of recording images on various media surfaces (e.g., paper), for a number of reasons, including, low printer noise, capability of high-speed recording and multi-color recording.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIGS. 3A-3I are black and white images illustrating examples of bleed control for a series of inks containing different surfactant combinations.

DETAILED DESCRIPTION

Figure 1:
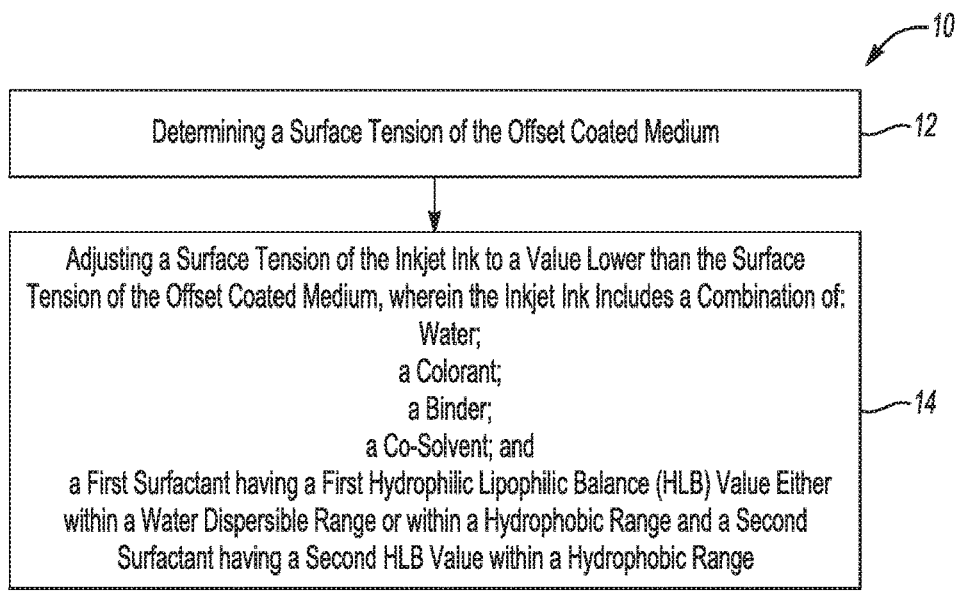
FIG. 1 is a flow chart depicting a method for preparing an inkjet ink, according to an example.

In inkjet printing, aqueous-based inks are commonly used on uncoated media, in part because the high surface energy of the aqueous ink enables the ink to spread well on the uncoated media. Aqueous inks may also be desirable for printing on coated offset media. However, coated offset media may be a slow-absorbing medium with high hold-out (i.e., colorants tend to remain on the surface of the media). Additionally, coated offset media may have a relatively low surface energy, and the higher surface energy aqueous inks may not spread well. As a result, images formed from aqueous inks on coated offset media tend to have reduced image quality attributes, such as, for example, gloss or optical density.

For recently-developed industrial printers, such as HP PageWide C500 Press and others, control of bleed and coalescence and avoiding text feathering at high speed can be challenging, especially when printing on coated offset media, which may not be suitable for rapid aqueous ink absorption. As used herein, high speed may refer to print speeds of at least 50 fpm, and up to 1000 fpm.

In theory, pre-treatment compositions may render coated offset media more suitable for printing with aqueous-based inks. Pre-treatment compositions are often substantially colorless liquids that interact with the colorant and/or with polymeric components of the ink composition in order to precipitate (i.e., crash) the colorants or otherwise fix the ink composition to the print media surface. Pre-treatment fixing fluid compositions have been applied on the coated offset media before the application of an ink composition in view of improving printing characteristics and attributes of the image. Some pre-treatment fixing fluid compositions have been applied to coated offset media and dried prior to subsequent ink application. This forms a dried ink-receiving type of layer on the surface of the medium. While this may desirably control bleed, the gloss of the resulting print often suffers.

For high speed inkjet printing, wet-on-wet printing (i.e., wet ink deposited on wet pre-treatment fixing fluid) may be desirable, for example, so that in-line printing can be performed. Wet-on-wet printing could also enable the use of commercially-available coated offset media which does not include any pre-treatment fixing fluid composition thereon, and thus may otherwise be undesirable for high speed inkjet printing. Without a fixing fluid for slow-absorbing print media (i.e., coated offset media), there is no control of pigment migration, and the result is color bleed and feathering of text. Wet-on-wet printing would provide the fixing fluid in-line rather than as a dried coating composition. The chemistry involved in wet-on-wet printing is complex, due in part to the interaction between the medium and the pre-treatment fixing fluid composition, and between the pre-treatment fixing fluid composition and the ink. In addition, for wet-on-wet printing, the slow-absorbing nature of coated offset media requires the pre-treatment fixing fluid composition to be highly (i.e., immediately) reactive with subsequently deposited inks in order to control bleed and pigment floatation (i.e., dot gain). The desired reactivity may be accomplished by increasing the organic acid salt content; however, it has been found that a higher salt content can lead to pen reliability issues resulting from corrosion and to the formation of prints with poor durability.

In accordance with the teachings herein, an inkjet ink for an offset coated medium is provided. The inkjet ink may have a composition including: water; a colorant; a binder that is a polyurethane-based dispersion; a co-solvent; and two or more surfactants, a first surfactant having a first hydrophilic lipophilic balance (HLB) value either within a water dispersible range or within a hydrophobic range and a second surfactant having a second HLB value within a hydrophobic range. The combination of the first surfactant and the second surfactant is to adjust a surface tension of the inkjet ink to a value lower than a surface tension of a print medium on which the inkjet ink is to be printed.

The present inventors have discovered that this combination of certain surfactants can provide significant improvements in the image quality (IQ; control of bleed and/or coalescence, and/or avoiding text feathering) of the print when high speed printing is utilized to print the ink on coated offset media. For example, it has been found that less water-soluble surfactant(s) (surfactants with a lower HLB value) can be used in combination with higher water-soluble surfactant(s) (surfactants with a higher HLB value) in the ink formulation to achieve a surface tension of the ink which leads to improved image quality. It has also been found that that less water-soluble surfactant(s) can be used in combination with other less water-soluble surfactant(s) in the ink formulation to achieve the desired surface tension of the ink which likewise leads to improved image quality.

In the HLB system, which is for use with nonionic surfactants, the lower the HLB value, the more lipophilic (oil-soluble) the surfactant is, while the higher the HLB value, the more hydrophilic (water-soluble) the surfactant is. The HLB value in the HLB system may range from 0 to 20 or more. In a somewhat more detailed view of the HLB value, a surfactant having a value of 0 to 6 is considered to be hydrophobic (oil-soluble), while a surfactant having a value between 6 and 12 is considered to be water-dispersible, and a surfactant having a value greater than 12 is considered to be hydrophilic (water-soluble). It will be appreciated that there is some ambiguity in the demarcation between the various classifications; for example, the line between water-dispersible and water-soluble may not be well-defined and may be in the range of 10 to 12, depending on the surfactant.

There are two cases of the surfactant combinations. In the first case, in the mixture of the two surfactants described above, the first HLB value may be greater than about 6 and less than about 12, while the second HLB value may be less than about 6. In the second case, in the mixture of the two surfactants described above, the first HLB value may be less than about 6, while the second HLB value may also be less than about 6.

In the first case, the first surfactant (having the HLB value greater than 6 and less than 12) may be present in an amount ranging from about 0.05 weight percent (wt %) to about 2 wt % based on the total wt % of the inkjet ink. The second surfactant (having the HLB value less than 6) may also be present in an amount ranging from about 0.05 wt % to about 2 wt % based on the total wt % of the inkjet ink. The total concentration of the two surfactants in the inkjet ink may be within a range of about 0.1 wt % to about 4 wt %.

In the second case, the first surfactant (having the HLB value less than 6) may be present in an amount ranging from about 0.05 weight percent (wt %) to about 0.9 wt % based on the total wt % of the inkjet ink. The second surfactant (also having the HLB value less than 6) may also be present in an amount ranging from about 0.05 wt % to about 0.9 wt % based on the total wt % of the inkjet ink. In this case, the maximum concentration of the two surfactants in the inkjet ink may be less than about 0.9 wt %, so as avoid any solubility issues of using two surfactants that each has low water solubility.

Table I below lists a number of surfactants that may be useful in the practice of the present teachings. Listed in Table I are the tradename of the surfactant, its generic description, its chemical name, and its HLB value.

TABLE I

| Series | Generic Description | Chemical Name | HLB |
|---|---|---|---|
| SURFYNOL ® (Air Products & Chemicals) | | | |
| SURFYNOL SE-F | Ethoxylated acetylenic diol | Ethoxylated 2,4,7,9-tetramethyl-5-decyne-4,7-diol | 4-5 |
| SURFYNOL CT-111 | Alkylphenylethoxylate | Poly(oxy-1,2-ethanediyl), α-(nonylphenyL)-ω-hydroxy-, branched plus 2,4,7,9-tetramethyl-5-decyne-4,7-diol | 8-11 |
| SURFYNOL CT-211 | Alkylphenylethoxylate | Poly(oxy-1,2-ethanediyl), α-(nonylphenyl)-ω-hydroxy-, branched plus 2,4,7,9-tetramethyl-5-decyne-4,7-diol | 8-12 |
| SURFYNOL 465 | Ethoxylated acetylenic diol | Ethoxylated 2,4,7,9-tetramethyl-5-decyn-4,7-diol | 13 |
| SURFYNOL CT-121 | Alkylphenylethoxylate | Poly(oxy-1,2-ethanediyl), α-(nonylphenyl)-ω-hydroxy-, branched plus 2,4,7,9-tetramethyl-5-decyne-4,7-diol, | 11-15 |
| SURFYNOL 104 | Acetylenic diol | 2,4,7,9-Tetramethyl-5-decyne-4,7-diol | 4 |
| SURFYNOL 440 | Ethoxylated acetylenic diol | Ethoxylated 2,4,7,9-tetramethyl-5-decyn-4,7-diol | 8 |
| TERGITOL ® (Union Carbide) | | | |
| TERGITOL TMN-3 | Branched secondary alcohol ethoxylate | Poly(oxy-1,2-ethanediyl), α-[3,5-dimethyl-1-(2-methylpropyl)hexyl]-ω-hydroxy-, branched | 8.1 |
| TERGITOL 15-5-5 | Nonionic secondary alcohol ethoxylate | secondary alcohol ethoxylate | 10.6 |
| TERGITOL TMN-6 | Branched secondary alcohol ethoxylate | Poly(oxy-1,2-ethanediyl), α-[3,5-dimethyl-1-(2-methylpropyl)hexyl]-ω-hydroxy-, branched | 11.7 |

TABLE I-continued

| Series | Generic Description | Chemical Name | HLB |
|---|---|---|---|
| TERGITOL 15-S-7 | Nonionic secondary alcohol ethoxylate | secondary alcohol ethoxylate | 12.4 |
| PLURONIC ® (BASF) | | | |
| PLURONIC L61 | Poloxamer* | Polyoxyethylene-polyoxypropylene block copolymer | 3 |
| PLURONIC 25R2 | Poloxamer* | Polyoxyethylene-polyoxypropylene block copolymer | 4 |
| PLURONIC L92 | Polyglycol | Methyl-oxirane polymer with oxirane | 6 |
| PLURONIC P123 | Poloxamer* | Polyoxyethylene-polyoxypropylene block copolymer | 8 |
| PLURONIC 17R4 | Poloxamer* | Polyoxyethylene-polyoxypropylene block copolymer | 12 |
| DYNOL ® (Air Products & Chemicals) | | | |
| DYNOL 960 | Siloxane-based | | 2-3 |
| DYNOL 800 | Acetylenic-type | | 3-4 |
| DYNOL 360 | Thioether of an acetylenic structure | Hydroxythioether | 3-4 |
| DYNOL 604 | Ethoxylated acetylenic diol | 2,5,8,11-Tetramethyl-6-dodecyn-5,8-diol ethoxylate | 9.6 |
| DYNOL 607 | Ethoxylated acetylenic diol | 2,5,8,11-Tetramethyl-6-dodecyn-5,8-diol ethoxylate | 12.1 |

*Poloxamers are nonionic triblock copolymers composed of a central hydrophobic chain of polyoxypropylene (poly(propylene oxide)) flanked by two hydrophilic chains of polyoxyethylene (poly(ethylene oxide)).

Based on the listings of surfactants in Table I, it will be appreciated that surfactants employed in the practice of the teachings herein may each be selected from acetylenic diols, alkylphenylethoxylates, ethoxylated acetylenic diols, secondary alcohol ethoxylates, polyoxyethylene-polyoxypropylene block copolymers, and hydroxythioethers. In a specific example, the first surfactant may be an ethoxylated acetylenic diol (e.g., SURFYNOL® 440; HLB Value=8) and the second surfactant may be a hydroxythioether (e.g., DYNOL® 360; HLB Value=3-4), which is an example of the first case. In another specific example, the first surfactant may be an acetylenic diol (e.g., SURFYNOL® 104; HLB Value=4) and the second surfactant may be a hydroxythioether (e.g., DYNOL® 360; HLB Value=3-4), which is an example of the second case.

It is noted above that the combination of the first surfactant and the second surfactant is used to adjust the surface tension of the inkjet ink to a value lower than the surface tension of the print medium on which the inkjet ink is to be printed. In general, the surface tension of the coated offset media on which the inkjet ink is to be printed is equal to or greater than 40 dynes per centimeter. Thus, the inkjet ink may have a surface tension of less than 40 dynes per centimeter. For example, the surface tension of the inkjet ink may be within a range of about 29 dynes per centimeter to about 36 dynes per centimeter.

As used herein, "ink vehicle" may refer to the liquid fluid in which colorant (e.g., a colorant dispersion) and, in some instances, polyurethane (e.g., a polyurethane dispersion) are placed to form the ink. A wide variety of ink vehicles may be used with the ink sets and methods of the present disclosure. The ink vehicle may include water alone or in combination with one or more different agents. Examples of these agents may include co-solvent(s), surfactant(s) (in addition to the first and second surfactant combination previously described), antimicrobial agent(s), anti-kogation agent(s), viscosity modifier(s), material(s) for pH adjustment, sequestering agent(s), preservative(s), jettability additive(s), and the like.

The ink vehicle may include a co-solvent present in total in the ink in an amount ranging from about 2 wt % to about 20 wt %, depending, at least in part, on the jetting architecture of the system used to print the ink. In an example, the co-solvent is present in the ink in an amount of about 10 wt % based on the total wt % of the ink. It is to be understood that other amounts outside of this example and range may also be used. Classes of co-solvents that may be used include organic co-solvents, such as aliphatic alcohols, aromatic alcohols, diols, glycol ethers, polyglycol ethers, 2-pyrrolidinones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like.

In some examples, the co-solvent may be selected from 1-(2-hydroxyethyl)-2-pyrrolidone (2HE2P), glycerol, tetraethylene glycol, di-(2-hydroxyethyl)-5,5-dimethylhydantoin, dipropylene glycol, diethylene glycol ethyl ether, tripropylene glycol methyl ether, and mixtures thereof. Di-(2-hydroxyethyl)-5,5-dimethylhydantoin is available as DANTOCOL™ DHE from Lonza Inc. (Allendale, N.J.).

The jettability additive, an example of which includes LIPONIC® EG-1 (LEG-1), may also be present. LEG-1 is a 26 mole ethoxylate of glycerin ethylene glycol, available from Advantage Specialty Ingredients (formerly Lipo Chemicals) (Warren, N.J.). The concentration of LEG-1 may be within a range of about 0.05 wt % to about 5 wt % based on the total wt % of the inkjet ink.

The anti-kogation agent, which may be a third surfactant, may be added to the ink to reduce kogation during inkjet printing. Kogation refers to the deposit of dried ink on a heating element of a thermal inkjet printhead. Anti-kogation agent(s) may be included to assist in preventing the buildup of kogation.

The anti-kogation agent/third surfactant may be polyoxyethylene (3) oleyl ether phosphate, which is available as CRODAFOS™ N3 (now CRODAFOS™ O3A) from Croda Inc. (Edison, N.J.). If this anti-kogation agent/surfactant is used, it may be present within a range of about 0.05 wt % to about 2 wt % based on the total wt % of the inkjet ink.

As an alternative to the previously described anti-kogation agent/third surfactant or in addition to the previously described anti-kogation agent/third surfactant, one or more of the surfactants listed in Table I may be used. It is to be understood that this surfactant is in addition to the first and second surfactant combination previously described. The additional surfactant(s) may be the same as or different than the first and/or second surfactants. The overall surfactant combination is determined by the solubility of each surfactant and how much is needed to establish the surface tension provided herein. As an example, low HLB surfactants (less than about 5) have poor water solubility (0.1% to 1%), and thus when included as an additional surfactant, the amount of the higher HLB surfactant may be increased to achieve a suitable surface tension.

The inkjet ink may be any color, such as black, cyan, magenta, yellow, etc. As such, in addition to the ink vehicle, the ink composition also includes a colorant. In an example, the colorant is an anionically dispersed pigment. In an example, the anionically dispersed pigment is a dispersion including water, the pigment, and an anionic polymer that disperses the pigment (i.e., the anionic polymeric dispersant). In an example, the pigment dispersion may also include, for example, a co-solvent, such as 2-pyrrolidone. The pigment dispersion may be prepared or purchased, and the other components of the ink (e.g., vehicle components, with or without polyurethane) may be slowly added to the pigment dispersion with continuous mixing, to form the inkjet ink.

As used herein, "pigment" may generally include organic or inorganic pigment colorants, magnetic particles, aluminas, silicas, and/or other ceramics, organo-metallics, metallic particulates, or other opaque particles that introduce color to the ink vehicle. The pigment may be any color, including, as examples, a cyan pigment, a magenta pigment, a yellow pigment, a black pigment, a violet pigment, a green pigment, a brown pigment, an orange pigment, a purple pigment, a white pigment, a metallic pigment (e.g., a gold pigment, a bronze pigment, a silver pigment, or a gold-bronze pigment), a pearlescent pigment, or combinations thereof.

Examples of suitable blue or cyan organic pigments include C.I. Pigment Blue 1, C.I. Pigment Blue 2, C.I. Pigment Blue 3, C.I. Pigment Blue 15, Pigment Blue 15:3, C.I. Pigment Blue 15:34, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4, and C.I. Vat Blue 60.

Examples of suitable magenta, red, or violet organic pigments include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), C.I. Pigment Red 48(Mn), C.I. Pigment Red 57(Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, C.I. Pigment Red 286, C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, and C.I. Pigment Violet 50.

Examples of suitable yellow organic pigments include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 77, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 122, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153, C.I. Pigment Yellow 154, C.I. Pigment Yellow 167, C.I. Pigment Yellow 172, C.I. Pigment Yellow 180, and C.I. Pigment Yellow 185.

Carbon black may be a suitable inorganic black pigment. Examples of carbon black pigments include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL® series, or the MONARCH® series manufactured by Cabot Corporation, Boston, Mass., (such as, e.g., REGAL® 400R, REGAL® 330R, REGAL® 660R, MOGUL® E, MOGUL® L, AND ELF-TEX® 410); and various black pigments manufactured by Evonik Degussa Orion Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4). An example of an organic black pigment includes aniline black, such as C.I. Pigment Black 1.

Some examples of green organic pigments include C.I. Pigment Green 1, C.I. Pigment Green 2, C.I. Pigment Green 4, C.I. Pigment Green 7, C.I. Pigment Green 8, C.I. Pigment Green 10, C.I. Pigment Green 36, and C.I. Pigment Green 45.

Examples of brown organic pigments include C.I. Pigment Brown 1, C.I. Pigment Brown 5, C.I. Pigment Brown 22, C.I. Pigment Brown 23, C.I. Pigment Brown 25, C.I. Pigment Brown 41, and C.I. Pigment Brown 42.

Some examples of orange organic pigments include C.I. Pigment Orange 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, and C.I. Pigment Orange 66.

A suitable metallic pigment may include a metal chosen from gold, silver, platinum, nickel, chromium, tin, zinc, indium, titanium, copper, aluminum, and alloys of any of these metals. These metals may be used alone or in combination with two or more metals or metal alloys. Some examples of metallic pigments include STANDART® R0100, STANDART® R0200, and DORADO® gold-bronze pigments (available from Eckart Effect Pigments, Wesel, Germany).

The total amount of pigment in the inkjet ink may range from about 1 wt % to about 5 wt % based on the total wt % of the ink composition. The average particle size of the pigments may range anywhere from about 80 nm to about 150 nm.

In the examples disclosed herein, the pigment may be dispersed by the anionic polymer (i.e., anionic polymeric dispersant). The dispersant may be present in an amount ranging from about 0.1 wt % to about 5 wt % of a total wt % of the ink composition.

In an example, the dispersant may be styrene-acrylic-type dispersants such as acrylic dispersants having i) hydrophilic monomers including acidic monomers, and ii) hydrophobic monomers. The acid number of the dispersant may range from about 120 mg/g to about 300 mg/g. It is to be understood that the styrene-acrylic-type dispersants are water-soluble. As such, no latex polymer is present in the ink composition.

Acidic monomers that may be used in the acrylic dispersant may include, for example, acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, and combinations thereof.

Examples of the hydrophobic monomers that can be polymerized in the acrylic dispersant may include styrene, p-methyl styrene, methyl methacrylate, hexyl acrylate, hexyl methacrylate, butyl acrylate, butyl methacrylate, ethyl acrylate, ethyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, ethoxylated nonyl phenol methacrylate, isobornyl methacrylate, cyclohexyl methacrylate, t-butyl methacrylate, n-octyl methacrylate, lauryl methacrylate, tridecyl methacrylate, alkoxylated tetrahydrofurfuryl acrylate, isodecyl acrylate, isobornylmethacrylate, and combinations thereof.

In addition, the inkjet ink may also include the polyurethane binder. In an example, the polyurethane binder is present in a dispersion with water. The polyurethane/polyurethane binder is present in the ink an amount ranging from greater than 1 wt % to about 20 wt % based upon the total wt % of the inkjet ink. In another example, the amount of polyurethane/polyurethane binder ranges from about 5 wt % to about 20 wt % or from greater than 5 wt % to about 15 wt % based upon the total wt % of the inkjet ink. This weight percentage accounts for the weight percent of active polyurethane/polyurethane binder present in the ink composition, and does not account for the total weight percent of the polyurethane binder dispersion in the inkjet ink. As such, the weight percentages given for the polyurethane/polyurethane binder do not account for any other components (e.g., water) that may be present when the polyurethane is part of the dispersion. The polyurethane binder dispersion may be added with the colorant (e.g., colorant dispersion) and the components of the ink vehicle to form the inkjet ink.

The polyurethane binder dispersion may be formed by synthesizing a polyurethane solution (i.e., the polyurethane polymer in an organic solvent), and then ionizing and dispersing the polyurethane solution in water to form the polyurethane binder dispersion. The resulting polyurethane binder dispersion includes the polyurethane polymer, which is water-soluble/dispersible. Each of these steps will be discussed further below.

The polyurethane binder may be formed from the following components: (a) a polyisocyanate; (b) a polyol having a chain with two hydroxyl functional groups at one end of the chain and no hydroxyl functional groups at the opposed end of the chain; and (c) an alcohol, or a diol, or an amine with a number average molecular weight less than 500; and one of (i) a carboxylic acid; (ii) a sulfonate or sulfonic acid having one amino functional group; (iii) a combination of (i) and (ii); and (iv) a combination of (i) and a homopolymer or copolymer of poly(ethylene glycol) having one or two hydroxyl functional groups or one or two amino functional groups at one end of its chain.

The amount of component (a) within the anionic polyurethane dispersion may range from about 20 wt % to about 60 wt % based upon the total resin amount in the dispersion. In an example, component (a) ranges from about 30 wt % to about 50 wt %.

Component (a) may be any polyisocyanate typically used in polyurethane chemistry. Some suitable polyisocyanates have an average of about two or more isocyanate groups. In an example, the polyisocyanate includes an average of from about 2 to about 4 isocyanate groups per molecule and from about 5 to 20 carbon atoms (in addition to nitrogen, oxygen, and hydrogen). Component (a) may be an aliphatic, cycloaliphatic, araliphatic, or aromatic polyisocyanate, as well as products of their oligomerization, used alone or in mixtures of two or more.

Some specific examples of suitable aliphatic polyisocyanates include alpha, omega-alkylene diisocyanates having from 5 to 20 carbon atoms, such as hexamethylene-1,6-diiso-cyanate, 1,12-dodecane diisocyanate, 2,2,4-trimethyl-hexamethylene diisocyanate, 2,4,4-trimethyl-hexamethylene diisocyanate, 2-methyl-1,5-pentamethylene diisocyanate, or the like. Polyisocyanates having fewer than 5 carbon atoms can also be used, but may be less desirable because of their relatively high volatility. In an example, the aliphatic polyisocyanate is selected from isophorone diisocyanate (IPDI), 2,2,4-trimethyl-hexamethylene-diisocyanate (TDMI), 2,4,4-trimethyl-hexamethylene diisocyanate, and hexamethylene diisocyanate (HDI).

Some specific examples of suitable cycloaliphatic polyisocyanates include dicyclohexylmethane diisocyanate (commercially available as DESMODUR™ W from Bayer Corp.), isophorone diisocyanate, 1,4-cyclohexane diisocyanate, 1,3-bis-(isocyanatomethyl)cyclohexane, or the like. In an example, the cycloaliphatic polyisocyanate is selected from dicyclohexylmethane diisocyanate and isophorone diisocyanate.

Some specific examples of suitable araliphatic polyisocyanates include m-tetramethyl xylylene diisocyanate, p-tetramethyl xylylene diisocyanate, 1,4-xylylene diisocyanate, 1,3-xylylene diisocyanate, or the like. In an example, tetramethyl xylylene diisocyanate is selected.

Examples of suitable aromatic polyisocyanates include 4,4'-diphenylmethylene diisocyanate, toluene diisocyanate and its isomers, naphthalene diisocyanate and its oligomeric forms, or the like. In an example, toluene diisocyanate is selected.

The amount of component (b) within the anionic polyurethane dispersion may range from about 10 wt % to about 50 wt % based upon the total resin amount in the dispersion. In an example, component (b) ranges from about 15 wt % to about 40 wt %.

Component (b) is a polyol. The term "polyol", as used herein, means any product having a chain with two hydroxyl groups at one end of the chain and no hydroxyl groups at the opposed end of the chain. The polyol may have a number average molecular weight ($M_n$) ranging from about 500 to about 5000. Additionally, the polyol may have a glass transition temperature ($T_g$) ranging from about −20° C. to about 100° C. In an example, the glass transition temperature is within a range of about 0° C. to about 80° C.

The polyol may be formed from the free radical polymerization of a monomer in the presence of a mercaptan that includes two hydroxyl functional groups or two carboxylic functional groups. The polyol may contribute to improved decap of the inkjet ink because the hydroxyl groups at one end of the chain of the polyol are incorporated into the polyurethane backbone chain, while the group at the other end of the polyol forms a pendant group or pendant chain, depending on what specific polyol is used. The polyol may segregate in the aqueous ink, which renders the polyurethane binder readily dispersible (i.e., more stable) in the ink vehicle. The polyol may also help prevent the polyurethane from swelling.

Some examples of the monomer used to form component (b) include an alkylester of acrylic acid or an alkylester of methacrylic acid, such as methyl (meth)acrylate, ethyl (meth)acrylate, n-butyl (meth)acrylate, tetrahydrofuryl (meth)acrylate, t-butyl (meth)acrylate, 2-ethylhexyl (meth) acrylate, hexyl (meth)acrylate, cyclohexyl (meth)acrylate, phenyl (meth)acrylate, benzyl (meth)acrylate, 2-aziridinylethyl (meth)acrylate, aminomethylacrylate, aminoethyl acrylate, aminopropyl (meth)acrylate, amino-n-butyl(meth) acrylate, N,N-dimethylaminoethyl(meth)acrylate, N,N-dimethylaminopropyl (meth)acrylate, N,N-diethylaminoethyl (meth)acrylate, and N,N-diethylaminopropyl (meth)acrylate.

Some other examples of the monomer used to form component (b) include an acid group containing monomer, such as acrylic acid, methacrylic acid, carboxyethyl (meth) acrylate, 2-(meth)acryloyl propionic acid, crotonic acid, and itaconic acid. In another example, the monomer used to form component (b) may be an acrylamide, an acrylamide derivative, methacrylamide, or a methacrylamide derivative. Some examples of acrylamide and methacrylamide derivatives include hydroxyethylacrylamide, N,N-methylol(meth)acrylamide, N-butoxymethyl (meth)acrylamide, and N-isobutoxymethyl (meth)acrylamide.

Some further examples of the monomer used to form component (b) may be styrene or a styrene derivative. Some examples of styrene derivatives include alpha-methyl styrene, p-aminostyrene, and 2-vinylpyridine. Additionally, the monomer used to form component (b) may be acrylonitrile, vinylidene chloride, a fluorine containing acrylate, a fluorine containing methacrylate, a siloxane containing acrylate, a siloxane containing methacrylate, vinyl acetate, or N-vinylpyrrolidone. Some specific examples include 2,2,2-trifluoroethyl acrylate, 1H, 1H, 3H-hexafluorobutyl acrylate, 1H, 1H, 3H-tetrafluoropropyl methacrylate, 1H, 1H, 5H-octafluoropentyl methacrylate, 1H, 1H, 5H-octafluoropentyl acrylate, poly(dimethylsiloxane), METHACRYLOXYPROPYL TERMINATED® DMS-R11 (made by Gelest Chemicals), and ACRYLOXY TERMINATED® DMS-U21 (made by Gelest Chemicals). It is to be understood that any combination of monomers listed for component (b) may be used.

Some examples of the mercaptan used to form component (b) include 1,2-propanediol (thioglycerol), 1-mercapto-1,1-ethanediol, 2-mercapto-1,3-propanediol, 2-mercapto-2-methyl-1,3-propanediol, 2-mercapto-2-ethyl-1,3-propanediol, 1-mercapto-2,3-propanediol, 2-mercaptoethyl-2-methyl-1,3-propanediol, and thioglycolic acid.

In one example, component (b) may be formed by preparing a solution of the monomer and mercaptan in an organic solvent. When a combination of two monomers is used, the two monomers may be present in a ratio ranging from about 1:1 to about 9:1. In an example, methyl methacrylate and 2-ethylhexyl acrylate are used in a combination of 9:1 respectively. When a combination of three monomers is used, the three monomers may be present in a ratio ranging from about 5:4:1 to about 10:8:3. In an example, methyl methacrylate, 2-ethylhexyl acrylate, and methacrylic acid are used in a combination of 10:8:3 respectively.

After the solution (including the monomer and the mercaptan) is prepared, the solution is placed in an inert environment. For example, a flow of nitrogen gas may be introduced through the solution to create the inert environment. The solution may then be heated to a suitable temperature for polymerization, and the reaction may be allowed to occur for a suitable time. The time and temperature for polymerization will depend upon the monomer(s) and mercaptan(s) used. In an example, the polymerization temperature is about 50° C. to about 90° C., and the reaction is allowed to occur for about 6 hours. In another example, the polymerization temperature is about 70° C.

The polyol formed may include the mercaptan ranging from about 2 wt % to about 10 wt % based on the total wt % of the polyol. In an example, the mercaptan may make up about 5 wt % of the total wt % of the polyol.

A specific polyol used herein, called polyol "A" herein, may be prepared by combining a 50-50 mixture of methyl methacrylate and t-butyl acrylate with 5 wt % of thioglycerol.

The polyurethane binder dispersion may further include component (c). Component (c) includes an alcohol, or a diol, or an amine. The alcohol or diol or amine has a number average molecular weight ($M_e$) of less than 500. In an example, component (c) is present in an amount ranging from 0 wt % to about 20 wt % based on the total wt % of the polyurethane. In another example, component (c) is present in an amount ranging from greater than 0 wt % to about 15 wt %.

Some examples of the alcohol or diol include methanol, ethanol, 1-butanol, propanol, 1,2-propanediol, 1,4-butanediol, 1,5-pentanediol, 1,6-hexanediol, neopentyl glycol, 1,4-cyclohexanediol, cyclohexane-1,4-dimethanol, ethylene glycol, diethylene glycol, triethylene glycol, bisphenol A, bisphenol A ethoxylate (BPAE, $M_n$=492), bisphenol A (2,3-dihydroxypropyl) glycidyl ether, bisphenol A bis(3-chloro-2-hydroxypropyl) ether, bisphenol A bis(2,3-dihydroxypropyl) ether, bisphenol A propoxylate, and 4,4'-sulfonyldiphenol. Examples of the amine include n-butylamine and ethylene diamine. Further examples of the alcohol include 1,3-butylene glycol diacrylate (BGDA) and diethyl carbonate with 1,6-hexanediol and 3-methyl-1,5-pentanediol, available from Kuraray Co., Ltd. (Tokyo, Japan) as Kuraray C-590.

In some instances, component (i) may also be used to form the polyurethane. Component (i) is a carboxylic acid. The amount of component (i) within the binder dispersion ranges from 0 wt % to about 10 wt % based upon the total wt % of the polyurethane. In an example, component (i) makes up from about 2 wt % to about 6 wt % of the polyurethane binder.

The presence of component (i) assists in the ability of the polyurethane to be dissolved or dispersed in water after ionization with a base. As previously stated, component (i) is a carboxylic acid. In some instances, component (i) includes two or more hydroxyl groups. Component (i) may have a number average molecular weight ($M_e$) of about 500. Examples of component (i) may be derived from hydroxycarboxylic acids having the general formula $(HO)_xQ(COOH)_y$, where Q is a straight or branched hydrocarbon radical containing 1 to 12 carbon atoms, and x is 2 or 3 and y ranges from 1 to 3. Examples of suitable hydroxycarboxylic acids include dimethylol propionic acid (DMPA), dimethylol butanoic acid (DMBA), alanine, citric acid, tartaric acid, glycolic acid, lactic acid, malic acid, dihydroxymaleic acid, dihydroxytartaric acid, or mixtures thereof.

Turning now to component (ii), component (ii) is a sulfonate or sulfonic acid having one amino functional group. The polyurethane dispersion disclosed herein, which may include component (ii), improves the decap performance and print reliability of the inkjet ink including the dispersion, without sacrificing (and in some instances improving) image quality. Some examples of component (ii) include taurine, 4-aminotoluene-3-sulfonic acid, aniline-2-sulfonic acid, sulfanilic acid, 4-amino-1-naphthalenesulfonic acid, 3-amino-4-hydroxybenzenesulfonic acid, 2-amino-1-naphthalenesulfonic acid, 5-amino-2-methoxybenzenesulfonic acid, 2-(cyclohexylamino) ethanesulfonic acid, and 3-amino-1-propanesulfonic acid. It is to be understood that in some examples, component (ii) has, at most, one hydroxyl functional group in addition to the sulfonate or sulfonic acid. Moreover, component (ii) does not function as a chain extender of the polyurethane.

Component (iii) is a combination of components (i) and (ii).

Component (iv) is a combination of component (i) and a homopolymer or copolymer of poly(ethylene glycol) (i.e., poly(ethylene oxide) having one hydroxyl functional group or one amino functional group. In other examples, component (iv) may be a combination of component (i) and a homopolymer or copolymer of poly(ethylene glycol) (i.e., poly(ethylene oxide) having two hydroxyl functional groups or two amino functional groups at one end of its chain. The homopolymer or copolymer of poly(ethylene glycol) has a number average molecular weight ($M_e$) ranging from about 500 to about 5,000. In another example, the homopolymer or copolymer of poly(ethylene glycol) has a number average molecular weight ($M_e$) ranging from about 500 to about 3,000. The homopolymer or copolymer also has a water solubility of greater than 30% v/v (volume of poly(ethylene glycol) to volume of water). Some commercially-available examples of the copolymer of poly(ethylene glycol) and poly(propylene glycol) with one amino functional group include JEFFAMINE® M-1000 and JEFFAMINE® M-2070, both available from Huntsman Chemicals (The Woodlands, Tex.).

Table II lists the components of two polyurethane dispersions that may be used in the examples disclosed herein. The following abbreviations are used in Table II: IPDI (isophorone diisocyanate), DMPA (2,2'-dimethylol propionic acid), and BGDA (1,3 butylene glycol diacrylate). JEFFAMINE® M-2070 is available from Huntsman Chemical). Polyol "A" is formed from 1:1 methyl methacrylate:t-butyl acrylate and 5% thioglycerol.

TABLE II

|  | Polyurethane Dispersion 1 | Polyurethane Dispersion 2 |
| --- | --- | --- |
| polyisocyanate | IPDI | IPDI |
| Polyol | A | A |
| alcohol or diol or amine | BGDA | Kuraray C-590 |
| a combination of (i) a carboxylic acid and (ii) a sulfonate or sulfonic acid having one amino functional group |  | DMPA + amino functional sulfonic acid |
| a combination of (i) a carboxylic acid and a copolymer of poly(ethylene glycol) and poly(propylene glycol) with one amino functional group | DMPA + JEFFAMINE ® M2070 |  |
| Phenol |  | 4-methoxyphenyl (MEHQ) |

The ink composition may further include a wax, which may provide a print standoff for surface abrasion during shipping and normal handling/processing. Print durability may be reduced when there is no wax in the ink. That is to say, shipping abrasion and/or dry rubbing may be minimized with the addition of wax to the ink.

The concentration of the wax, if present, may be within a range of about 0.1 wt % to about 1.5 wt % based on the total wt % of the inkjet ink. An example of a suitable wax is a wax emulsion such as LIQUILUBE™ 405, available from The Lubrizol Corporation (Wickliffe, Ohio), which is a specially stabilized large particle wax polyethylene emulsion designed for use in water-based inks. Another example of a suitable wax is a polyfluoroethylene wax.

The inkjet ink may be paired with a pre-treatment fixing fluid in an inkjet ink set. In some instances, a pre-treatment fixing fluid may be applied to the medium prior to printing the inkjet ink onto the medium. The pre-treatment fixing fluid is now described in greater detail.

The pre-treatment fixing fluid may be suitable for wet-on-wet printing on the coated offset media. Generally, the pre-treatment fixing fluid may include one or more calcium salts, an acid present in an amount sufficient to render a pH of the pre-treatment fixing fluid from about 4.0 to about 7.0, and a balance of water. More specifically, the pre-treatment fixing fluid may include (in addition to water) a particular combination of salts (at a desirably low content), a particular co-solvent, and a low HLB (hydrophilic-lipophilic balance) surfactant that is capable of dynamically lowering the surface tension of the pre-treatment fluid. In the examples disclosed herein, the HLB of the surfactant used in the pre-treatment fixing fluid (i.e., the low HLB) is less than 6. In one example, the pre-treatment fixing fluid includes a mixture of calcium propionate and calcium nitrate, a particular co-solvent (e.g., tetraethylene glycol, glycerol, etc.), a low HLB surfactant (e.g., SURFYNOL® SE-F), which may or may not be in combination with a high HLB surfactant (e.g. CARBOWET® GA-211), a pH-adjusting acid (e.g., methanesulfonic acid), and a balance of water. In some examples, the pre-treatment fixing fluid consists of these components alone, and in other examples, the pre-treatment fixing fluid includes these components and an anti-microbial agent.

The selected salt(s), solvent, and surfactant together may advantageously promote dot gain and reduce feathering and pigment flotation, resulting in higher quality text prints. The composition of the pre-treatment fixing fluid disclosed herein may also exhibit desirable pen reliability, such as improved decap time.

The pre-treatment fixing fluid disclosed herein includes one or more calcium salts. Examples of calcium salts include calcium propionate, calcium nitrate, and calcium pantothenate. The use of calcium salts provides the pre-treatment fixing fluid with metal salts that may cause the pigment or colorant in the ink deposited thereon to coagulate, and that may control pigment migration/flotation etc. The total calcium salt concentration may be within a range of about 1 wt % to about 15 wt % based on the total wt % of the pre-treatment fluid. The amount of the metal salts is believed to be high enough to achieve the desired fixing effect without deleteriously affecting pen reliability.

The pre-treatment fixing fluid may also include tetraethylene glycol as a co-solvent. The tetraethylene glycol may be present in total in the pre-treatment fixing fluid in a range from about 0.1 wt % to about 30 wt %. The amount used may depend, at least in part, on the jetting architecture used to apply the pre-treatment fixing fluid. In an example, the amount of tetraethylene glycol used is about 12 wt %.

The pre-treatment fixing fluid also includes the low HLB surfactant. This type of surfactant is capable of dynamically controlling, in particular, lowering, the surface tension of the pre-treatment fixing fluid. The low HLB surfactant may provide the pre-treatment fluid, at the time of its application, with a surface tension that is lower than the surface energy of the coated offset medium upon which the pre-treatment fixing fluid is being applied. As such, the contact angle between the pre-treatment fixing fluid and the medium may be zero degrees (0°), which enables the pre-treatment fixing fluid to spread out across the medium surface in a horizontal direction (with respect to the medium surface), and effectively wet and reduce the surface energy of the offset coated medium.

An example of the low HLB surfactant is a self-emulsifiable wetting agent based on acetylenic diol chemistry (e.g., SURFYNOL® SE-F). The low HLB surfactant may be present in the pre-treatment fixing fluid in an amount ranging from about 0.05 wt % to about 1.5 wt % based on the total wt % of the pre-treatment fixing fluid. In an example, the amount of the surfactant is about 0.05 wt %. However, if the concentration of the low HLB surfactant is at its high end, it may be necessary to add a higher HLB surfactant, such as a non-ionic, alkylphenylethoxylate and solvent-free surfactant (e.g., CARBOWET® GA-211 surfactant, a.k.a. SURFYNOL® CT-211, from Air Products and Chemicals, Inc.) to help solubilize the low HLB surfactant. It is believed that the desired surface tension may not be obtainable with other amounts and/or other surfactants.

In some examples, the pre-treatment fixing fluid may also include an antimicrobial agent. Antimicrobial agent(s), such as biocides and fungicides, may be added to inhibit the growth of harmful microorganisms. Example antimicrobial agents may include the NUOSEPT® (Ashland Inc.), UCARCIDE® or KORDEK® (Dow Chemical Co.), and PROXEL® (Arch Chemicals) series, and combinations thereof. A total amount of the antimicrobial agents in the pre-treatment fixing fluid may range from about 0.05 wt % to about 1 wt %. In an example, the pre-treatment fixing fluid includes about 0.1 wt % of a biocide.

The balance of the pre-treatment fixing fluid may be water. In addition, buffer(s) may be used to adjust the pH of the pre-treatment fixing fluid to a particular pH. One example of a suitable buffer is methanesulfonic acid. In some examples, the buffer may be used in an amount sufficient to buffer the pH of the pre-treatment fixing fluid so that it ranges from 4.0 to 7.0. In an example, the pH of the pre-treatment fixing fluid is adjusted to about 6.6 using methanesulfonic acid.

It is to be understood that the pre-treatment fixing fluid excludes any latex polymer.

FIG. 1 depicts a method 10 for the preparation of the inkjet ink. The method 10 includes determining a surface tension of an offset coated medium on which the inkjet ink is to be printed on (reference numeral 12), and adjusting a surface tension of the inkjet ink to a value that is lower than the surface tension of the offset coated medium (reference numeral 14). The surface tension of the medium may be measured, for example, using a tensiometer or using test fluid indicators for surface tension.

The surface tension of the inkjet ink may be adjusted by the combination of the first surfactant and the second surfactant. As previously set forth, the inkjet ink may include: water; a colorant; a binder; a co-solvent; and two or more surfactants. One of the surfactants (the first surfactant) has a first hydrophilic lipophilic balance (HLB) value either within a water dispersible range or within a hydrophobic range. Another of the surfactants (the second surfactant) has a second HLB value within a hydrophobic range. As noted above, the combination of the first surfactant and the second surfactant is to adjust a surface tension of the inkjet ink to a value lower than a surface tension of a print medium on which the inkjet ink is to be printed. In preparing the inkjet ink, the foregoing components are combined together.

Turning now to a discussion of a printing method, it is to be understood that the print medium may be a coated offset medium. A coated offset medium is any paper coated to impart better image quality by providing some degree of surface gloss, smoothness, and reduced ink absorbency. Examples of commercially-available coated offset media include STERLING® Ultra Gloss (NewPage Corp.) and UTOPIA™ Digital (Appleton Coated LLC).

In a first example of the print method, an example of the pre-treatment fixing fluid may be applied directly onto the medium using any suitable high speed (e.g., from about 50 fpm to about 1000 fpm) inkjet printing apparatus, including thermal inkjet printers or web presses, piezoelectric inkjet printers or web presses, or continuous inkjet printers or web presses. As noted above, the medium may be any type of coated offset medium, such as, for example, STERLING® Ultra Gloss media.

When the pre-treatment fixing fluid is utilized in the printing method, the amount of pre-treatment fixing fluid that is applied to the medium ranges from about 1 gsm to about 7 gsm.

In this example of the printing method, no drying operation is performed after the pre-treatment fixing fluid is applied on the medium. Rather, while the pre-treatment fixing fluid is wet, the inkjet ink disclosed herein is deposited on the medium with the pre-treatment fixing fluid thereon. In other words, after the pre-treatment fixing fluid is applied to the medium, the inkjet ink may be applied to the wet pre-treatment fixing fluid coated on the medium. When multiple ink colors are used, it is to be understood that all of the inks are applied while previously deposited layers are still wet.

The inks may be applied onto the pre-treatment fixing fluid using the same suitable high speed inkjet printing apparatus disclosed herein for the pre-treatment fixing fluid application. It is to be understood that no drying takes place between the application of the pre-treatment fixing fluid and the ink.

The salts present in the pre-treatment fixing fluid instantaneously react with the colorant (e.g., anionically dispersed pigment) present in the ink, causing the pigment to crash out of ink and fixing the pigment on the medium surface. In addition, the applied pre-treatment fixing fluid provides the coated offset medium with a reduced surface energy, which causes the deposited ink(s) (which have a reduced surface tension) to spread less than if the surface energy were higher. This improved wetting contributes to bleed control and better dot gain, and thus enhances the print quality attributes of at least optical density and gloss. This benefit is in addition to the benefits obtained from the instantaneous fixing of the colorant(s) in the ink by the salts in the pre-treatment fixing fluid. Essentially, the surface tension of the ink is adjusted to minimize pigment migration but still provide adequate dot gain.

After applying the pre-treatment fixing fluid and ink onto the medium, a drying operation may be performed. The drying operation(s) may be performed at ambient temperature or under heat using a heating device (e.g., heat lamp, oven, etc.). For example, the drying operation may be performed at about 80° C., or in some examples, at about 100° C., or in still further examples, at 80° C. and then at 100° C.

Employing the particular surfactant combination (one surfactant having either an HLB value of 6-12 or an HLB value of less than 6 and another surfactant having an HLB value of less than 6) in the inkjet ink may result in:

flexibility in using different combinations of surfactants to adjust the surface tension of the ink to achieve media independence (good image quality on coated and uncoated media);

combinations of a low or non-water-soluble surfactant mixed with a water-soluble surfactant to wet offset print media;

control of bleed and/or coalescence at high speed by adjusting the surface tension on coated media;

formation of high quality text on coated media at high speed; and/or minimizing the amount of surfactant concentration in the ink formulation to achieve good image quality.

To further illustrate the present disclosure, examples are given herein. It is to be understood that these examples are provided for illustrative purposes and are not to be construed as limiting the scope of the present disclosure.

EXAMPLES

Example 1

A series of inkjet inks (cyan, magenta, and black) was prepared. All compositions had the following common components:

5 wt % polyurethane binder 1 or polyurethane binder 2;
5 wt % co-solvent—2HE2P;
0.5 wt % CRODAFOS N3 (anti-kogation agent);
1 wt % LEG-1;
1 wt % LIQUILUBE LL 405 Wax;
x wt % total surfactant; and
balance of water.

The cyan ink included 2.25 wt % of cyan pigment. The magenta ink included 4.0 wt % of magenta pigment. The black ink included 2.75 wt % of black pigment.

Table III below lists the weight percent of each of the first and second surfactants and the value of "x", and the different surfactants for seven compositions.

TABLE III

Figure 2:
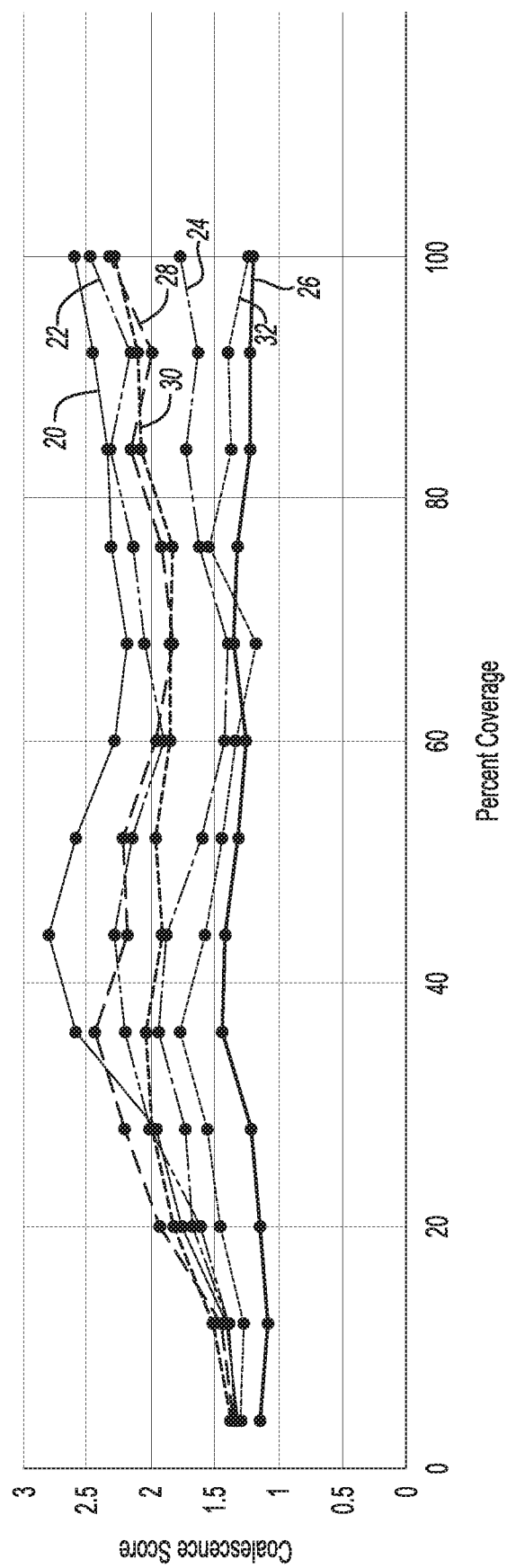
FIG. 2 is a plot on coordinates of a coalescence score (Y-axis) and percent ink coverage (X-axis) of the coalescence of inks containing different surfactant combinations, according to examples.

| | First Surfactant | | | Second Surfactant | | | Curve |
|---|---|---|---|---|---|---|---|
| x Wt % | Wt % | Surfactant Name | HLB Value | Wt % | Surfactant Name | HLB Value | No. in FIG. 2 |
| 0.8 | 0.8 | SURFYNOL CT-211 | 8-12 | 0 | None | N/A | 20 |
| 0.8 | 0.4 | SURFYNOL CT-211 | 8-12 | 0.4 | TERGITOL TMN-3 | 8.1 | 22 |
| 0.8 | 0.4 | SURFYNOL CT-211 | 8-12 | 0.4 | DYNOL 960 | 2-3 | 24 |
| 0.5 | 0.25 | SURFYNOL 440 | 8 | 0.25 | DYNOL 360 | 3-4 | 26 |
| 0.8 | 0.4 | SURFYNOL CT-211 | 8-12 | 0.4 | SURFYNOL SE-F | 4-5 | 28 |
| 0.8 | 0.4 | SURFYNOL CT-211 | 8-12 | 0.4 | PLURONIC 25R2 | 4 | 30 |
| 0.4 | 0.2 | SURFYNOL 104 | 4 | 0.2 | DYNOL 360 | 3-4 | 32 |

FIG. 2 illustrates the results of coalescence control by the various surfactant combinations listed in Table III. Curve 20 depicts a control ink (one surfactant), and Curve 22 depicts an ink having a surfactant combination in which both surfactants had an HLB value that is greater than 6. The remaining curves (Curves 24-32) all depict either inks that had one surfactant having an HLB value greater than 6 and another surfactant having an HLB value less than 6 (Curves 24-30) or an ink that had both surfactants having an HLB value that is less than 6 (Curve 32). The surface tension of the inks represented by Curves 24-32 was in the range of about 32 dynes per cm to about 34 dynes per cm.

The coalescence was measured by printing an ink in a series of squares, ranging from 4% coverage to 100% coverage (X-axis). A scanner was used to measure the white space in each square. An algorithm translated the optical measurement to a coalescence score (Y-axis). A relatively higher score is indicative of poor coalescence.

The compositions depicted by curves 26 and 32 are seen to have the best coalescence. Curve 26 represents a particularly desirable surfactant combination, mentioned above, SURFYNOL® 440 and DYNOL® 360. Curve 32 represents another particularly desirable surfactant combination, mentioned above, SURFYNOL® 104 and DYNOL® 360.

Other considerations are bleed control and text feathering. Table IV below lists the surfactant combinations for the inks (having the common components described above) used to create the images in FIGS. 3A-3I.

TABLE IV

| | First Surfactant | | | Second Surfactant | | |
|---|---|---|---|---|---|---|
| Wt % | Surfactant Name | HLB Value | Wt % | Surfactant Name | HLB Value | FIG. No. |
| 0.8 | SURFYNOL CT-211 | 8-12 | — | — | | 3A |
| 0.4 | SURFYNOL CT-211 | 8-12 | 0.4 | SURFYNOL SE-F | 4-5 | 3B |
| 0.3 | SURFYNOL CT-211 | 8-12 | 0.3 | SURFYNOL SE-F | 4-5 | 3C |
| 0.4 | SURFYNOL CT-211 | 8-12 | 0.4 | PLURONIC 25R2 | 4 | 3D |
| 0.3 | SURFYNOL CT-211 | 8-12 | 0.3 | PLURONIC 25R2 | 4-5 | 3E |
| 0.4 | SURFYNOL CT-211 | 13 | 0.4 | TERGITOL TMN-3 | 8.1 | 3F |
| 0.3 | SURFYNOL CT-211 | 13 | 0.3 | TERGITOL TMN-3 | 8.1 | 3G |
| 0.4 | SURFYNOL CT-211 | 8-12 | 0.4 | DYNOL 960 | 2-3 | 3H |
| 0.3 | SURFYNOL CT-211 | 8-12 | 0.3 | DYNOL 960 | 2-3 | 3I |

FIG. 3A depicts the bleed control and text feathering of a control ink which had the same formulation as the control ink used to generate Curve 20 in FIG. 2 (one surfactant), and FIGS. 3F and 3G each depict the bleed control and text feathering of an ink having a surfactant combination in which both surfactants had an HLB value that is greater than 6. The ink used to form the images in FIG. 3F had the same formulation as the ink used to generate Curve 22 in FIG. 2. The ink used to form the images in FIG. 3B had the same formulation as the ink used to generate Curve 28 in FIG. 2; the ink used to form the images in FIG. 3D had the same formulation as the ink used to generate Curve 30 in FIG. 2; and the ink used to form the images in FIG. 3H had the same formulation as the ink used to generate Curve 24 in FIG. 2.

The portion of each drawing (FIGS. 3B-3I), denoted "A", was a swath of cyan ink printed between two swaths of magenta ink. However, for FIG. 3A (control), a swath of black ink was printed between two swaths of cyan ink (A') and another swath of black ink was printed between two swaths of magenta ink (A"). The portion of each drawing (FIGS. 3A-3I), denoted "B #", was cyan ink (B1) or magenta ink (B2) printed on a double coated media (a slow-absorbing print medium with high hold-out).

As can be seen from an inspection of FIGS. 2 and 3A-3I together, the inks formulated with one surfactant having an HLB value greater than 6 and another surfactant having an HLB value less than 6 (FIG. 3B (Curve 28), 3C, 3D (Curve 30), 3E, 3H (Curve 24), and 3I) had improved coalescence, bleed and/or text feathering when compared to the control (FIG. 3A (Curve 20)) and the inks formulated with two surfactants having an HLB value greater than 6 (FIG. 3F (Curve 22) and FIG. 3G).

For example, the surfactant combination used to form FIG. 3B had improved bleed control and coalescence (at high percent coverage) when compared to the control and the surfactant combination used to form FIG. 3F (Curve 22). For another example, the surfactant combination used to form FIG. 3C had improved bleed control when compared to the control and the surfactant combinations used to form FIGS. 3F and 3G. For still another example, the surfactant combination used to form FIG. 3D had improved bleed control, text feathering, and coalescence when compared to the control and the surfactant combinations used to form FIG. 3F (Curve 22). For yet a further example, the surfactant combination used to form FIG. 3E had improved text feathering when compared to the control and the surfactant combinations used to form FIGS. 3F and 3G. Still further, the surfactant combination used to form FIG. 3H had improved bleed control and coalescence when compared to the surfactant combination used to form FIG. 3F (Curve 22). Finally, the surfactant combination used to form FIG. 3I had improved text feathering when compared to the surfactant combinations used to form FIG. 3F. Overall, the results illustrate that one or more image qualities may be improved using the surfactant combinations disclosed herein.

Example 2

The basic set of inkjet inks of Example 1 was prepared with SURFYNOL® 104 and DYNOL® 360 and polyurethane binder 1. Another set of inks was prepared in which the polyurethane binder 1 was replaced with or polyurethane binder 2. In the latter set, the surfactant combination was also slightly modified, replacing SURFYNOL® 104 with SURFYNOL® 440. Table V below shows the composition and Figure associated therewith. The surface tensions of both sets of inks were in the range of about 32 dynes per cm to about 34 dynes per cm.

TABLE V

| | | First Surfactant | | | Second Surfactant | | |
|---|---|---|---|---|---|---|---|
| Binder | Wt % | Surfactant Name | HLB Value | Wt % | Surfactant Name | HLB Value | FIG. No. |
| 5 wt % polyurethane binder 1 | 0.2 | SURFYNOL 104 | 4 | 0.2 | DYNOL 360 | 3-4 | 4A |
| 5 wt % polyurethane binder 2 | 0.2 | SURFYNOL 440 | 8 | 0.2 | DYNOL 360 | 3-4 | 4B |

The portion of each figure, denoted A1"," is a swath of black ink printed between two swaths of cyan ink. "A2" is a swath of black ink printed between two swaths of magenta ink. "A3" is a swath of cyan ink printed between two swaths of magenta ink. A3 is the same printing arrangement as A in FIGS. 3A-3I. The portion of each figure, denoted "B #", is cyan ink (B1) or magenta ink (B2) or black ink (B3) printed on a double coated media (a slow-absorbing medium with high hold-out).

Figure 4A:
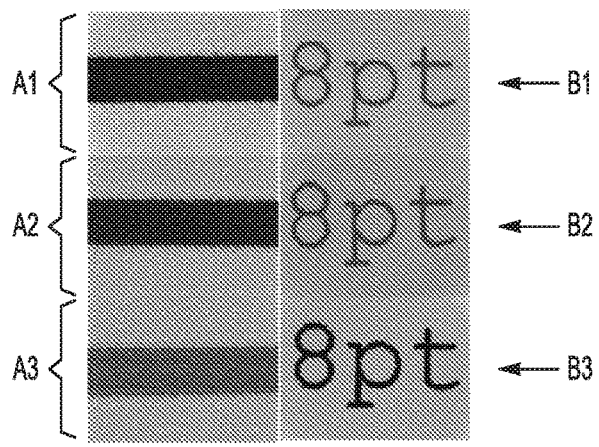
FIGS. 4A-4B are black and white images illustrating examples of bleed control for two inks having example combinations of surfactants disclosed herein and having different polyurethane dispersions.
Figure 4B:

As can be seen from an inspection of FIGS. 4A-4B, even by changing the binder, making small changes in surfactant combinations, and adjusting the surface tension show very good control on bleed and high quality text on coated media.

The ink used to form the images in FIG. 4A had the same surfactant combination as the ink used to generate Curve 32 in FIG. 2; and the ink used to form the images in FIG. 4B had the same surfactant combination as the ink used to generate Curve 26 in FIG. 2. As noted above, these two surfactant combinations also show very good control on coalescence.

Overall, the results in Examples 1 and 2 illustrate that the particular surfactant combinations disclosed herein may be selected, in part, to achieve an improvement in one or more image quality attribute, such as bleed control, a reduction in text feathering, and/or coalescence.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 50 fpm to about 1000 fpm should be interpreted to include not only the explicitly recited limits of about 50 fpm to about 1000 fpm, but also to include individual values, such as 75 fpm, 900 fpm, etc., and sub-ranges, such as from about 65 fpm to about 850 fpm, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. An inkjet ink for an offset coated medium, comprising:
   water;
   a colorant;
   a binder that is a polyurethane-based dispersion;
   a co-solvent; and
   two or more surfactants, a first surfactant having a first hydrophilic lipophilic balance (HLB) value either within a water dispersible range or within a hydrophobic range and a second surfactant having a second HLB value within a hydrophobic range;
   wherein the first surfactant is an ethoxylated acetylenic diol and the second surfactant is a hydroxythioether; or the first surfactant is an acetylenic diol and the second surfactant is a hydroxythioether;
   and wherein the combination of the first surfactant and the second surfactant is to adjust a surface tension of the inkjet ink to a value lower than a surface tension of the offset coated medium on which the inkjet ink is to be printed.

2. The inkjet ink as defined in claim 1 wherein the first HLB value is either greater than about 6 and less than about 12 or less than about 6, and the first surfactant is present in an amount ranging from about 0.05 wt % to about 2 wt % based on the total wt % of the inkjet ink; and wherein the second HLB value is less than about 6, and the second surfactant is present in an amount ranging from about 0.05 wt % to about 2 wt % based on the total wt % of the inkjet ink, with the proviso that when the HLB values for both the first surfactant and the second surfactant are below 6, then the total surfactant concentration is less than about 0.9 wt %, based on the total wt % of the ink.

3. The inkjet ink as defined in claim 1 wherein the surface tension of the inkjet ink is less than 40 dynes per centimeter.

4. The inkjet ink as defined in claim 3 wherein the surface tension of the inkjet ink is within a range of about 29 dynes per centimeter to about 36 dynes per centimeter.

5. The inkjet ink as defined in claim 1 wherein the polyurethane-based dispersion includes:
   water; and
   a polyurethane dispersed in the water, the polyurethane having been formed from:
      a polyisocyanate;
      a polyol having a chain with two hydroxyl functional groups at one end of the chain and no hydroxyl groups at an opposed end of the chain, and having a number average molecular weight ranging from about 500 to about 5,000;
      an alcohol or a diol or an amine having a number average molecular weight less than 500; and one of
      i) a carboxylic acid;
      ii) a sulfonate or sulfonic acid having one amino functional group;
      iii) a combination of i and ii; and
      iv) a combination of i and a homopolymer or copolymer of poly(ethylene glycol) having one or two hydroxyl functional groups or one or two amino functional groups at one end of its chain.

6. The inkjet ink as defined in claim 1 wherein the co-solvent is selected from the group consisting of 1-(2-hydroxyethyl)-2-pyrrolidone, glycerol, tetraethylene glycol, di-(2-hydroxyethyl)-5, 5-dimethylhydantoin, dipropylene glycol, diethylene glycol ethyl ether, tripropylene glycol methyl ether, and mixtures thereof.

7. The inkjet ink as defined in claim 1 further including a third surfactant to reduce kogation during inkjet printing, selected from the group consisting of polyoxyethylene (3) oleyl ether phosphate, acetylenic diols, ethoxylated acetylenic diols, secondary alcohol ethoxylates, polyoxyethylene-polyoxypropylene block copolymers, and hydroxythioethers.

8. A method for preparing an inkjet ink for printing on an offset coated medium, the method comprising:
   determining a surface tension of the offset coated medium; and
   adjusting a surface tension of the inkjet ink to a value lower than the surface tension of the offset coated medium, wherein the inkjet ink includes a combination of:
   water;
   a colorant;
   a binder;
   a co-solvent; and
   a first surfactant having a first hydrophilic lipophilic balance (HLB) value either within a water dispersible range or within a hydrophobic range, and a second surfactant having a second HLB value within a hydrophobic range;
   wherein the first surfactant is an ethoxylated acetylenic diol and the second surfactant is a hydroxythioether; or the first surfactant is an acetylenic diol and the second surfactant is a hydroxythioether;
   wherein the adjusting of the surface tension of the inkjet ink is accomplished by the combination of the first surfactant and the second surfactant.

9. The method as defined in claim 8 wherein the first HLB value is either greater than about 6 and less than about 12 or less than about 6, and the first surfactant is present in an amount ranging from about 0.05 wt % to about 2 wt % based on the total wt % of the inkjet ink; and wherein the second HLB value is less than about 6, and the second surfactant is present in an amount ranging from about 0.05 wt % to about 2 wt % based on the total wt % of the inkjet ink, with the proviso that when the HLB values for both the first surfactant and the second surfactant are below 6, then the total surfactant concentration is less than about 0.9 wt %, based on the total wt % of the ink.

10. The method as defined in claim 8 wherein the surface tension of the inkjet ink is within a range of about 29 dynes per centimeter to about 36 dynes per centimeter.

11. An inkjet ink set for an offset coated medium, comprising:
   a pre-treatment fixing fluid, including:
      calcium salts;
      an acid present in an amount sufficient to render a pH of the pre-treatment fixing fluid from about 4.0 to about 7.0; and
      a balance of water; and
   an inkjet ink, including:
      water;
      a colorant;
      a binder;
      a co-solvent; and
      two or more surfactants, a first surfactant having a first hydrophilic lipophilic balance (HLB) value either within a water dispersible range or within a hydrophobic range, and a second surfactant having a second HLB value within a hydrophobic range;
      wherein the first surfactant is an ethoxylated acetylenic diol and the second surfactant is a hydroxythioether; or the first surfactant is an acetylenic diol and the second surfactant is a hydroxythioether;
   wherein the combination of the first surfactant and the second surfactant is to adjust a surface tension of the inkjet ink to a value lower than a surface tension of a print medium on which the inkjet ink is to be printed.

* * * * *